UNITED STATES PATENT OFFICE.

ROBERT H. McFARLAND, OF GRAND RAPIDS, MICHIGAN.

FOOD COMPOUND.

No. 884,606.  Specification of Letters Patent.  Patented April 14, 1908.

Application filed April 1, 1907. Serial No. 365,866.

*To all whom it may concern:*

Be it known that I, ROBERT H. MCFARLAND, a citizen of the United States of America, residing at Grand Rapids, in the county of Kent and State of Michigan, have invented certain new and useful Improvements in Food Compounds; and I do hereby declare the following to be a full, clear, and exact description of the invention, such as will enable others skilled in the art to which it appertains to make and use the same.

My invention relates to a composition of material for making pastry, and particularly for making biscuits; and its object is to provide a compound of ready mixed ingredients requiring but the addition of moisture in the form of water, milk or other suitable liquid, such compound having the desirable quality of being mixed in a dry condition and remaining permanent in such condition for any desired length of time, whereby the same may be prepared in quantities and stored, transported and sold as an article of merchandise.

Heretofore it has been found necessary to combine the ingredients for making pastry shortly before using the same because the "shortening" ingredient therein has been some form of fatty substance such as butter, suet, lard or other fatty material, containing a considerable proportion of oil or oily substance. Such shortening material renders the mixture unfit for the proposed purpose, because the shortening will cause the particles of flour and other powdery materials to adhere, and form masses or lumps that soon become unfit for use, because the compound will soon decompose, or become "rancid" and thus wholly unpalatable and unfit for food by decomposition of the oil or oily ingredients therein.

I have discovered that the residue of hard fat compounds after the oils or oily parts thereof have been expressed will satisfactorily operate as a shortening, and when mixed with the other ingredients necessary to form pastry, the mixture will remain in powdered form and will also remain unchanged, and in proper condition for use, for a long period of time and under the usual conditions of storage and transportation.

My invention preferably consists of a mixture comprising a commercial stearin, which is the residue of a fatty substance after the oil, or oily portions have been removed therefrom, together with flour, seasoning and gas producing ingredients, such as a baking powder, as contra-distinguished from a compound containing a shortening of fatty substance from which the oil normally contained therein has not been removed.

I prefer to use a commercial stearin consisting mainly of a glycerid of stearic acid and derived from a hard fat by removal of the oil or oily ingredients normally therein. This stearin need not be chemically pure or derived from any particular animal or vegetable material, its essential feature being that the oil normally therein has been removed to such an extent that it will not cause the compound to adhere in lumps or to turn rancid, which result I have discovered has heretofore been due to the presence of the oil or oily ingredients which have been supposed necessary to the performance of the shortening function.

I prefer to use substantially the following ingredients in substantially the proportions named, to-wit: one hundred parts by weight, comprising finely comminuted or pulverized commercial stearin (substantially such as heretofore described) twelve parts; baking powder, ten parts; wheat flour, seventy-six parts; salt, two parts. These ingredients are to be intimately mixed by any convenient means and in a dry and powdery condition. When thus mixed they constitute suitable material to form pastry, and especially to form biscuits, by merely adding to the same a sufficient amount of moisture to form a dough, which addition may be of water, milk, or some other suitable liquid, as preferred.

This described compound will remain unchanged under all ordinary conditions of storage and transportation, and can be thus placed in proper packages for commercial purposes, and sold or stored or used as occasion may require.

I am aware that so-called self-rising flour has been made in which the gas producing element, commonly known as baking powder or some similar ingredient, has been mingled with the flour, but I believe it to be new, to provide a compound having therein an ingredient commonly known as "shortening" that can be mixed with the other dry ingredients necessary to form pastry in a dry condition, and that when so mixed will keep unchanged for any convenient length of time, it being heretofore customary to prepare compounds of this character by adding the shortening to the other ingredients immediately prior to use, for the reason that suet, lard, butter or other like fats will soon turn rancid or decompose when mixed with flour in suitable proportions for making pastry.

What I claim is:

1. A compound for making pastry, consisting of a dry mixture of finely comminuted stearin, substantially such as described, together with flour, baking powder and salt in about the proportions specified.

2. A compound for making pastry consisting of a mixture in substantially the following proportions: of commercial stearin, (substantially such as described) twelve per cent.; baking powder, ten per cent.; wheat flour, seventy-six per cent.; and salt, two per cent.

3. A compound for making pastry, comprising finely comminuted stearin (substantially such as described) combined with flour, in suitable proportion for use in making pastry, together with gas producing materials and seasoning substantially as described.

4. The combination of a shortening for pastry consisting of the residue of a hard fat after the oil or oily matter normally therein has been substantially removed therefrom, in combination with flour, baking powder and seasoning material in about the proportions specified.

In testimony whereof I affix my signature in presence of two witnesses.

ROBERT H. McFARLAND.

Witnesses:
PALMER A. JONES,
LUTHER V. MOULTON.